United States Patent [19]

Fujita et al.

[11] Patent Number: 4,486,569
[45] Date of Patent: Dec. 4, 1984

[54] POLYVINYL CHLORIDE COMPOSITION

[75] Inventors: Tamio Fujita, Akashi; Fumiya Nagoshi, Kobe, both of Japan

[73] Assignee: Kanegafuchi Kagaku Kogyo Kabushiki Kaisha, Osaka, Japan

[21] Appl. No.: 492,872

[22] Filed: May 9, 1983

[51] Int. Cl.³ .................... C08L 31/04; C08L 33/08; C08L 33/12

[52] U.S. Cl. .................................. 525/80; 525/70; 525/85

[58] Field of Search ................ 525/80, 85, 70

[56] References Cited

U.S. PATENT DOCUMENTS 3,925,510 12/1975 Ide et al. .................................. 525/80
4,179,481 12/1979 Tuzuki et al. ........................ 525/80

Primary Examiner—Jacob Ziegler
Attorney, Agent, or Firm—Moonray Kojima

[57] ABSTRACT

A polyvinyl chloride composition having improved processability, high clarity, and high heat distortion temperature is prepared by blending (I) 99 to 30 parts by weight of polyvinyl chloride or vinyl chloride copolymer having at least 80 weight percent vinyl chloride; and (II) 1 to 70 parts by weight of a polymer which is obtained by polymerizing 1 to 30 weight percent of a mixture (B) comprising 40 to 80 weight percent styrene monomer and 60 to 20 weight percent alkyl ester of acrylic acid or alkyl ester of methacrylic acid, in the presence of 99 to 70 weight percent methyl methacrylate polymer (A) or copolymer (A) having more than 75 weight percent methyl methacrylate and less than 25 weight percent styrene monomer, the polymer (A) or copolymer (A) having a specific viscosity of less than 0.6.

9 Claims, 1 Drawing Figure

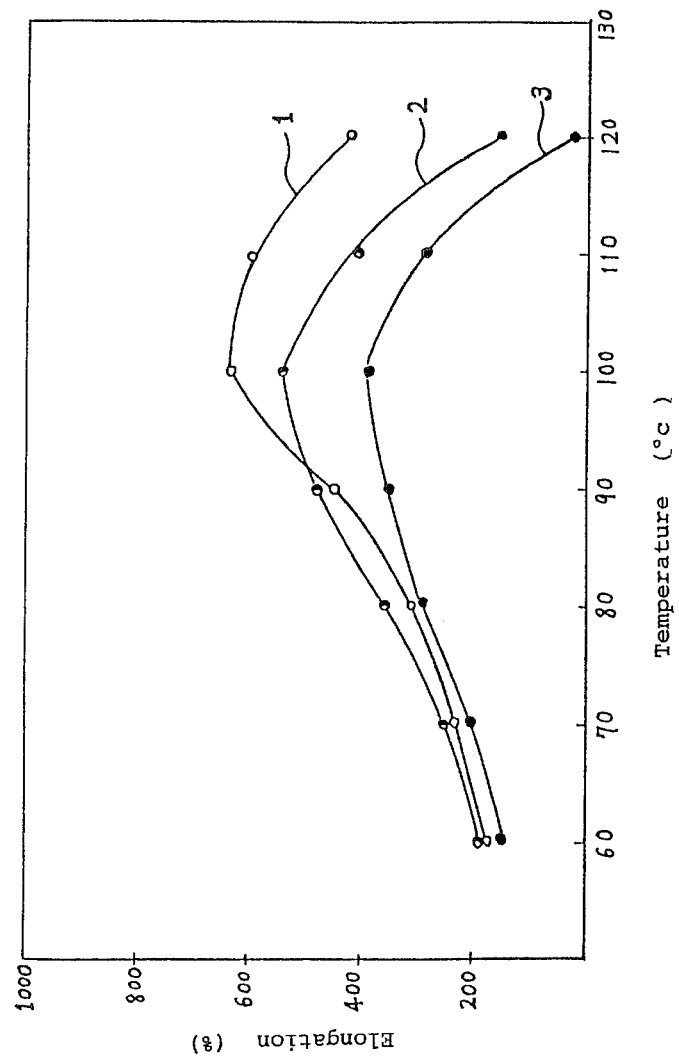

POLYVINYL CHLORIDE COMPOSITION

BACKGROUND OF THE INVENTION

1. Field of the Invention

This invention relates to a polyvinyl chloride composition having improved processability, high clarity, and high heat distortion temperature.

2. Description of the Prior Art

Polyvinyl chloride is in general use because to its outstanding chemical and physical properties. Nevertheless, it is not necessarily satisfactory in heat stability and impact strength, and it requires improvement in processability and heat distortion temperature. In order to overcome these disadvantages, there have been proposed a variety of solutions, including the addition of stabilizers, plasticizers, lubricant, and other chemicals. Improvement through polymeric blending is also commonly practiced. Polymeric blending accelerates gelation in the molding process of polyvinyl chloride, permits deep drawing of moldings, and improves heat distortion temperature of moldings.

There is disclosed in Japanese Patent Publication No. 5311/1965 a polymer consisting mainly of methyl methacrylate which is claimed to accelerate the gelation of polyvinyl chloride and improve processability wuch as an increase of elongation at high temperatures. According to this disclosure, the polymer should have a specific viscosity $\eta_{sp}$ greater than 3 (as measured a 1 g/1000 ml chloroform and 20° C.). One to three parts of this polymer is added to 100 parts of polyvinyl chloride to greatly improve the processability in rolling and to give good sheet molding. However, it was found that if it is added in larger quantities, for example 5 to 10 parts, the resulting blend becomes extremely viscous in the melt flow, with the result that mixing resistance increases and molding is very difficult to perform. Moreover, using this process, moldings are tinged with a yellow color, and remarkable shrinkage of molding also takes place.

There is disclosed in Japanese Patent Publication No. 29895/1976, incorporation of polyvinyl chloride with a methyl methacrylate-alpha-methylstyrene copolymer. This blending improves the heat distortion temperature of polyvinyl chloride, but has a serious drawback in that ungelled particles occur in large numbers in sheets extruded from such blend. Moreover, due to the lack of lubrication on a roll mill, the blend is liable to stick to the screw, die and calendering rolls used therein, making difficult, continuous operation. These disadvantages are pronounced when high speed molding is carried out at a high molding temperature.

Thus, there exists in the art a deficiency which needs to be fullfilled.

SUMMARY OF THE INVENTION

Accordingly, an object of the invention is to overcome the aforementioned and other disadvantages, deficiencies and problems of the prior art.

Another object is to provide a novel polyvinyl chloride composition having high clarity, high heat distortion temperature, improved processability, such as elongation at high temperatures, deep drawing, improved release from roll mill surfaces, and improved extrudability.

The foregoing and other objects are attained by the invention which encompasses a polyvinyl chloride composition comprising (I) 99 to 30 parts (by weight, the same designation shall apply hereinafter where applicable unless otherwise stated) of polyvinyl chloride or a vinyl chloride copolymer in which at least 80% (by weight, the same designation shall apply hereinafter where applicable unless otherwise stated) is vinyl chloride; and (II) 1 to 70 parts of a polymer which is obtained by polymerizing 1 to 30% of a mixture (B) comprising 40 to 80% styrene monomer and 60 to 20% alkyl ester of acrylic acid or alkyl ester of methacrylic acid (the alkyl group therein having 2 to 18 carbon atoms), in the presence of 99 to 70% methyl methacrylate polymer (A) or a copolymer (A) of more than 75% methyl methacrylate and less than 25% styrene monomer; the polymer (A) or copolymer (A) having a specific viscosity ($\eta_{sp}$, C=0.4 g/100 ml benzene, 30° C.) lower than 0.6, whereby the resulting polyvinyl chloride composition has properties of improved processability, high clarity, and high heat distortion temperature. The polymer (II) is mixed or blended with the polyvinyl chloride (I), to produce the resulting composition. Component (A) is first polymerized, and then the component (B) is polymerized in the presence of component (A) so that component (B) will form a cover partly or entirely over polymerized component (A). This order of polymerization of the different components has been found to be important toward imparting the desired properties of the resulting polyvinyl chloride composition, and the combination of the desired properties produced by this invention was surprising and completely unexpected. A novel composition with greatly desired commercial properties was thus produced by this invention.

BRIEF DESCRIPTION OF THE DRAWING

The single FIGURE is a graph depicting a comparison of an illustrative embodiment and comparison examples, in terms of relationship between elongation and temperatures as measured for sheets produced therefrom.

DETAILED DESCRIPTION OF PREFERRED EMBODIMENTS

The polyvinyl chloride (I), used in this invention, is defined as a polyvinyl chloride or a vinyl chloride copolymer in which at least 80% is vinyl chloride, and such term "polyvinyl chloride (I)" shall be so interpreted whereever used, unless defined to the contrary when used. Examples of the copolymer include vinyl chloride-vinyl acetate copolymer; vinyl chloride-alkyl vinyl ether copolymer, vinyl chloride-ethylene copolymer; and vinyl chloride-propylene copolymer. These polymers and copolymers may be produced by emulsion polymerization, suspension polymerization, bulk polymerization, and other methods.

Polymer (II), as used herein is defined as comprising a comparatively hard polymer component (A) consisting of methyl methacrylate polymer or copolymer having at least 75% methyl methacrylate and remainder styrene monomer, as defined herein; and a comparatively soft copolymer component (B) consisting of alkyl ester of acrylic acid or alkyl ester of methacrylic acid, and styrene monomer, as defined herein.

Polymer (II) is added to the polyvinyl chloride (I) in an amount, preferably, of 1 to 70 parts, more preferably 5 to 50 parts, for 99 to 30 parts of polyvinyl chloride (I). The two are mixed or blended uniformly together. As a result there is an unexpected improvement in processability, elongation at high temperature, and high heat distortion temperature. If the quantity is less than 1 part, improvement of the resulting composition in the properties of processability and heat distortion temperature is not sufficient. If the quantity exceeds 70 parts, the resulting composition is greatly improved in heat distortion temperature, but, toughness and other properties of the resulting composition are reduced.

The copolymer component (B) is believed to be effective in preventing formation of ungelled particles and sticking of resin composition to metal surfaces.

The ranges of quantities of component (A) and component (B) are preferably 99 to 70% and 1 to 30%, respectively. If the quantity of component (A) is less than 70%, the resulting composition is not improved in heat distortion temperature, although it does not stick to metal surfaces, nor forms ungelled particles, which are often found in extruded sheets.

If the amount of component (A) exceeds 99%, and component (B) is less than 1%, the resulting composition is poor in releasability, although it is improved in heat distortion temperature and elongation at high temperature. In such a case, the resulting composition tends to stick to the calendering rolls, extrusion screw and die, making it difficult to carry out molding continuously for a long period of time. Also, a large number of ungelled particles appears on the molded sheet to impair clarity and surface smoothness thereof.

In order for the polymer (II) used for blending with polyvinyl chloride (I), to be able to improve the resulting composition, in clarity, elongation at high temperatures, and heat distortion temperature, it should be highly miscible with polyvinyl chloride. Component (A) used in this invention, is characteristic in its high miscibility with polyvinyl chloride.

Polymer component (A) is defined herein as being methyl methacrylate, or a copolymer of more than 75% (preferably more than 85%) of methyl methacrylate and less than 25% (preferably less than 15%) styrene monomer, as defined hereinbelow. Polymer component (A) is highly miscible with polyvinyl chloride. However, when a copolymer of methyl methacrylate is used, the copolymer tends to become poor in compatibility with polyvinyl chloride, when the amount of methyl methacrylate is less than 75% and the amount of styrene monomer is greater than 25%. Accordingly, the copolymer should not have less than 75% methyl methacrylate, or more than 25% styrene monomer.

Styrene monomer, is defined herein as including, for example, styrene; alpha methylstyrene; and other-substituted styrene; and o-methyl styrene; p-tert-butylstyrene; chlorostyrene; and other nucleous-substituted styrene. They may be used singly or in combination of two or more.

In order to achieve improved performance increased flowability, and reduced molding shrinkage, with the resulting composition, it is necessary that polymer component (A) should preferably have a specific viscosity lower than 0.6, and more preferably less than 0.3. If the specific viscosity is greater than 0.6, the resulting composition is poor in flowability due to increased melt viscosity, which leads to increased mixing toque and poor moldability. Polymer component (A) may be preferably added in small quantities. If a polymer having a specific viscosity greater than 0.6 is added in large quantities, the resulting composition suffers from molding shrinkage and poor appearance.

The methyl methacrylate polymer as a major consituent of polymer component (A) is highly sticky to metal surfaces. Thus, if polymer component (A) alone (that is without adding component (B)) is added to polyvinyl chloride, the resulting composition is improved in heat distortion temperature and fabricability, such as elongation at high temperature, but is sticky to rollers, screw and die. This hinders continuous sheet molding operation. In addition, the resulting composition gives rise to a large number of ungelled particles that impair the gloss and clarity of the produced sheet. Presumably, this is because polymer component (A) has a high softening point and does not melt completely at the molding temperature of polyvinyl chloride.

Component (B), which is effective in solving the just discussed problems involved in molding and fabrication, is preferably a mixture of 60 to 20% alkyl ester of acrylic acid or alkyl ester of methacrylic acid and 40 to 80% styrene monomer, as defined herein; and polymerized in the presence of polymerized polymer component (A). If the content of styrene monomer is more than 80%, component (B) is poor in preventing sticking, and the resulting composition is poor in clarity. Similarly, if the content of alkyl ester of acrylic acid or alkyl ester of methacrylic acid is more than 60%, the resulting composition is poor in clarity. One kind or more than one kind of the alkyl ester of acrylic acid or the alkyl ester of methacrylic acid should be selected from those having an alkyl group of carbon number 2 to 18, inclusive. The styrene monomer may be selected from those listed above, and preferably styrene and substituted styrene.

It is important that the polymerization of component (B) be carried out in the presence of polymerization latex of component (A). This is an important feature of the invention which when followed leads to unexpected results, as discussed above.

After polymerization of component (A), component (B) of the monomer mixture just discussed, is added and polymerized. The polymer of component (A), which is relatively hard, is covered, entirely or partly, with the polymer of component (B), which is relatively soft. The resulting polymer flows easily during molding and fabrication. It is believed the foregoing to be one reason why the dispersion in polyvinyl chloride is improved and ungelled particles do no occur in the molded sheet.

It was discovered that, in contrast to the invention, when a polymeric mixture resulting from uniform mixing (that is without polymerization) of monomer component (A) and monomer of component (B) was blended with polyvinyl chloride, no improvement was made in heat distortion temperature, as shown in the below example. Moreover, when polymer component (A) and polymer component (B) were each polymerized separately, and then blended with polyvinyl chloride, prevention of ungelled particles in extrusion molding was also not satisfactory, although improvement was made in heat distortion temperature, elongation at high temperature, fabricability and sticking to metal surfaces. Furthermore, when component (A) was polymerized in the presence of polymer component (B), no satisfactory results were obtained. Also, when the polymer of component (A) and polymer of component (B) were added separately in the form of dry powder to polyvinyl chloride, the resulting composition provided molding sheet containing a large number of ungelled particles.

According to the invention, it is essential that component (B) be polymerized in the presence of polymer component (A). It was discovered that this order of adding polymerization ingredients was important toward and unexpectedly produced the imparting of the desired properties of the resulting composition. Any other order of adding polymerization ingredients will not produce the desired results. When this method having specified steps is employed, and the resulting polymer (II) is blended with polyvinyl chloride (I), the resulting polyvinyl chloride composition has improved processability, easy release from roll mills, excellent clarity, high heat distortion temperature, and large elongation at high temperature.

The resulting polymer (II) should preferably be prepared by emulsion polymerization, wherein a common emulsifier is used, a water-soluble redox-type polymerization initiator is used, and a proper chain transfer agent is applied. The reaction product, in the form of a latex is coagulated, washed, dehydrated and dried and thereby formed into a powder resin.

The resulting polymer (II) may be mixed with or blended with polyvinyl chloride (I) in any commonly used manner. The resulting polyvinyl chloride composition may be incorporated with stabilizer, lubricant, colorant, filler, etc, which are commonly used for polyvinyl chloride, or it may be used for molding without using such additives. In addition, the polyvinyl chloride composition of this invention may be blended with an impact modifier to impart impact resistance to the composition.

The invention will now be described in terms of actual examples, which examples are not to be construed in any limiting way.

EXAMPLES 1-3 AND COMPARATIVE EXAMPLES 1-11

Into a reaction vessel, equipped with a stirrer and reflux condenser, were charged the following materials.

| | |
|---|---|
| Distilled water | 300 parts. |
| Dioctylsulfosuccinic ester sodium salt | 3.0 parts |
| Sodium formaldehyde sulfoxylate | 0.5 parts |
| Disodium ethylenediaminetetraacetate | 0.01 parts |
| Ferrous sulfate | 0.005 parts. |

The atmosphere in the reactor was replaced with nitrogen gas, and the reactor was heated to 60° C. To the reaction was added dropwise, a mixture comprising 72 parts of methyl methacrylate, 8 parts alpha methylstyrene, 0.16 parts of tert-dodecylmercaptan, and 0.4 parts of cumene hydroperoxide, whereby polymer latex of component (A) was obtained. Thereafter, to the reactor containing the polymerized latex of component (A), was added dropwise, for polymerization, a mixture of component (B) comprising 8 parts n-butyl acrylate, 12 parts styrene, 0.1 parts of tert-dodecylmercaptan, and 0.1 parts of cumene hydroperoxide. Polymerization continued at 60° C. until completed.

After addition of antioxidant, the resulting polymer latex was subjected to salting-out, filtration, washing, and drying, whereby Example 1, shown in Table 1, was obtained in the form of powdery polymer.

Using the same reaction vessel as above, polymers of different compositions were prepared from components (A) (being methyl methacrylate and alpha methylstyrene) and components (B) (being n-butyl acrylate and styrene), in the amounts and ratios listed in Table 1.

Then, twenty parts of polymer (II) thus obtained was mixed with 100 parts of polyvinyl chloride (I), 2.5 parts of dibutyltin mercaptide stabilizer, and 0.5 parts of lubricant, for 5 minutes on a roll mill heated to 180° C. A sheet prepared by this roll mill was then pressed at 190° C. under 50 kg/cm$^2$ pressure for 15 minutes. Test pieces were punched out from the pressed sheet and their physical properties were measured. The results are shown in Table 2.

In Comparative Example 11, polyvinyl chloride alone without any polymer (II) was used.

It is to be noted that the compositions in Examples 1, 2 and 3 of this invention, in which 20 parts of polymer (II) was blended, are 6° to 7° C. higher in Vicat softening point, than the polyvinyl chloride composition of Comparative Example 11, using polyvinyl chloride alone. At the same time, Examples 1, 2 and 3 blended to the PVC (I), produced compositions which were comparatively the same as polyvinyl chloride alone, in terms of clarity and izod impact strength.

In Comparative Example 1, wherein component (A) comprised methyl methacrylate and alpha methylstyrene at a ratio of 70 to 30, the resulting composition was improved only a little in Vicat softening point (81° C.) and greatly decreased in light transmittance.

In Comparative Examples 2 and 3, wherein content of n-butyl acrylate in component (B) was 90% and 10%, respectively, the resulting compositions were poor in clarity and high in haze.

In Comparative Example 4, wherein the polyvinyl chloride composition was identical in its composition to that of Example 1, the resulting composition was not improved in Vicat softening point because components (A) and (B) were first uniformily mixed and then polymerized.

In Comparative Example 7, wherein component (B) in polymer (II) was as high as 40%, the resulting polyvinyl chloride composition was improved only little in Vicat softening point.

Polyvinyl chloride compositions obtained in Comparative Examples 5, 6, 8, 9, and 10 were improved in Vicat softening point and light transmittance, but were not satisfactory in processability and appearance of moldings. More details are given hereinunder.

It is noted that only the compositions of Examples 1, 2 and 3 were improved in heat distortion temperature with no loss of the outstanding clarity of polyvinyl chloride alone.

Turning back to Comparative Examples 5, 6, 8, 9 and 10, in Comparative Example 5, component (B) was omitted. In Comparative Example 6, the chain transfer agent was reduced to increase the specific viscosity $\eta_{sp}$ of the polymer. In Comparative Example 8, component (B) was polymerized first and then component (A) was polymerized, with the same monomer composition as in Example 1. In Comparative Example 9, components (A) and (B) were polymerized separately and the resulting latexes were blended to give a polymeric mixture. In Comparative Example 10, components (A) and (B) were polymerized separately and the resulting powdery polymers were mixed together.

Polyvinyl chloride compositions were prepared by blending 100 parts of polyvinyl chloride (having a polymerization degree of 680) with 20 parts of the polymers, polymeric mixtures, or Polymer (II), prepared in each of the above Examples 1 and 2, and Comparative Examples 5, 6, 8, 9, 10; 2.5 parts of butyltin mercaptide stabilizer; and 0.5 parts of lubricant. Blending was carried out at 110° C. using a high-speed blender.

The resulting polyvinyl chloride compositions were subjected to the following tests.

SHEET EXTRUSION MOLDING TEST

The resulting polyvinyl chloride composition was extruded into a 0.25 mm thick sheet using a single screw extruder having a screw diameter of 50 mm, a screw compression ratio of 1:3, and a L/D ratio of 22, with a coat hanger die. The appearance of each sample sheet was observed.

ROLL MIXING TEST

The resulting polyvinyl chloride composition was subjected to roll milling at 205° C. (roll surface temperature) and at 20 rpm using an 8 inch roll mill. During roll milling, the composition was removed from the roll mill at suitable intervals so as to measure the time for the composition to stick to the roll surface. The appearance of the rolled sheet was observed.

BRABENDER MIXING TEST

In a chamber of a Brabender Plasti-Corder, was placed 55 g of the resulting polyvinyl chloride composition, and mixing was started after 3 minute preheating and torque was measured at a rotor speed of 45 rpm and at a chamber temperature of 180° C.

The results are shown in Table 3.

As shown in Table 3, in Comparative Example 5, wherein component (B) was omitted, the resulting polyvinyl chloride composition gave a hazy rough surface sheet having a large number of ungelled particles, although, as shown in Table 2, it had a high Vicat softening point.

Also, in Table 3, in Comparative Example 6, wherein component (A) had a specific viscosity higher than the limit specified for this invention, the resulting polyvinyl chloride composition gave very high mixing torque, as shown in the Brabender mixing test. Thus, the resulting composition could not be extruded into a sheet. In addition, the resulting composition was non-sticking in the roll mixing test, but suffered from such an extremely high shrinkage that any sheet of desired thickness was not obtained and the appearance of the sheet was unsatisfactory.

Also, in Table 3, in Comparative Examples 8, 9 and 10, the resulting polyvinyl chloride composition was prepared in the same proportions as in Example 1, but the polymerization was carried in a different way as discussed in the "Remarks" to Table 1. The resulting compositions were all as good in release from roll mill surfaces, appearance of rolled sheet, and mixing torque, as Example 1, However, the resulting compositions for these Comparative Examples had ungelled particles in their extruded sheets.

Next tests were run on Example 1, Comparative Example 1 and Comparative Example 11, to measure elongation at high temperatures, with the results being shown in the graph of the sole FIGURE of the drawing.

The resulting polyvinyl chloride compositions were formed into sheets using a roll mill, and the sheets were pressed at 190° C., under 50 kg/cm² pressure, for 5 minutes to give 0.5 mm thick sheets for each example.

Test pieces of each of Example 1, Comparative Examples 1 and 11, were prepared according to JIS K6734, and measurements were carried out by subjecting the pieces to tensile tests, at temperatures of 60° to 120° C., at a pulling rate of 200 mm/min. The results are shown in the FIGURE, wherein curve 1 represents Example 1, curve 2 represents Comparative Example 11, and curve 3 represents Comparative Example 2. From the graph, it can be seen that Comparative Example 1 is poorer in elongation at any temperature than polyvinyl chloride alone (i.e. Comparative Example 11), and that the composition of Example 1, was greatly improved in elongation at 100° C.; 110° C. and 120° C.

TABLE 1

| | Composition of monomer charged. (Parts by Weight) | | | | | |
|---|---|---|---|---|---|---|
| | Component (A) | | | Component (B) | | |
| | methyl methacrylate | Alpha Methylstyrene | Tert-dodecylmercaptan | n-butyl acrylate | styrene | Tert-dodecyl mercaptan |
| Example | | | | | | |
| 1 | 72 | 8 | 0.16 | 8 | 12 | 0.1 |
| 2 | 85 | 10 | 0.19 | 2 | 3 | 0.02 |
| 3 | 68 | 12 | 0.16 | 8 | 12 | 0.1 |
| Comparative Example | | | | | | |
| 1 | 56 | 24 | 0.16 | 8 | 12 | 0.1 |
| 2 | 72 | 8 | 0.16 | 18 | 2 | 0.1 |
| 3 | 72 | 8 | 0.16 | 2 | 18 | 0.1 |
| 4 | | | (See remarks #1) | | | |
| 5 | 90 | 10 | 0.20 | 0 | 0 | 0 |
| 6 | 72 | 8 | 0.05 | 8 | 12 | 0.1 |
| 7 | 54 | 6 | 0.12 | 16 | 24 | 0.2 |
| 8 | | | (See remarks #2) | | | |
| 9 | | | (see remarks #3) | | | |
| 10 | | | (See remarks #4) | | | |
| 11 | | | (See remarks #5) | | | |

| Conversion of Polymerization (%) | Specific Viscosity of Component (A) |
|---|---|
| 98 | 0.18 |
| 98 | 0.18 |
| 98 | 0.17 |
| 96 | 0.17 |
| 98 | 0.17 |
| 98 | 0.18 |
| 98 | 0.17 |
| 97 | 0.18 |
| 95 | 1.00 |
| 97 | 0.18 |

TABLE 1-continued

| | | |
|---|---|---|
| | 99 (Comp. (A)) | 0.18 |
| | 97 (Comp. (B)) | |
| | 99 (Comp. (A)) | 0.18 |
| | 97 (Comp. (B)) | |

REMARKS.
1. Same as in Example 1, except that components (A) and (B) were first uniformily mixed and then polymerized.
2. Same as in Example 1, except that component (B) was polymerized first, and then Component (A) was polymerized.
3. Same as in Example 1, except that components (A) and (B) were polymerized separately, and the resulting latexes were blended together.
4. Same as in Example 1, except that components (A) and (B) were polymerized separately and blended in the form of powder.
5. Polyvinyl chloride alone, i.e. without any additive, such as Polymer (II).

TABLE 2

| | *1 Izod Impact strength (kg-cm/cm) | *2 Vicat softening point (°C.) | *3 Light Transmitance (%) | *4 Haze (%) |
|---|---|---|---|---|
| Ex. | | | | |
| 1 | 3.2 | 85.0 | 84.5 | 1.2 |
| 2 | 3.0 | 86.0 | 85.0 | 1.1 |
| 3 | 3.2 | 86.0 | 85.0 | 1.1 |
| Comp. Ex. | | | | |
| 1 | 2.8 | 81.0 | 36.8 | 33.2 |
| 2 | 3.4 | 83.0 | 54.3 | 21.3 |
| 3 | 3.0 | 85.0 | 57.6 | 18.1 |
| 4 | 3.2 | 80.0 | 75.0 | 3.4 |
| 5 | 2.8 | 86.0 | 85.0 | 1.0 |
| 6 | 3.2 | 86.0 | 84.0 | 1.2 |
| 7 | 3.4 | 82.5 | 78.0 | 2.6 |
| 8 | 3.2 | 85.0 | 84.5 | 1.1 |
| 9 | 3.2 | 85.0 | 85.0 | 1.1 |
| 10 | 3.2 | 85.0 | 84.0 | 1.2 |
| 11 | 3.0 | 79.0 | 83.0 | 2.6 |

NOTES:
*1 Measured in accordance with JIS K7110.
*2 Measured in accordance with JIS K7206
*3 Measured using a 1.5 mm thick press plate according to JIS K6714
*4 Measured using a 1.5 mm thick press plate according to JIS K6714

TABLE 3

| | Appearance of extruded sheet*1 | Sticking to roll mill *2 | Appearance of roll-mixed sheet *3 | Brabender Mixing torque (kg-m) *4 |
|---|---|---|---|---|
| Ex. | | | | |
| 1 | A | A | A | 1.9 |
| 2 | A-B | A-B | A | 1.9 |
| Comp. Ex. | | | | |
| 5 | D | C-D | A-B | 2.0 |
| 6 | not moldable | A | D | 2.6 |
| 8 | C-D | B | A | 1.9 |
| 9 | C | A | A | 1.9 |
| 10 | D | A | A | 1.9 |

Notes:
*1 The appearance of molded sheets were observed with the naked eye and classed by four following ranking:
A = Sheet had good appearance, with no ungelled particles.
B = Sheet contained less than five ungelledparticles in 500 cm$^3$.
C = Sheet contained 6 to 20 ungelled particles in 500 cm$^3$.
D = Sheet contained more than 21 ungelled particles in 500 cm$^3$.
*2 Time for composition to stick to roll surface at 205° C. and 20 rpm, classed according to following ranking:
A = No sticking after 10 min. of mixing.
B = Sticking after 6 minutes of mixing.
C = Sticking after 3 minutes of mixing.
D = Sticking after 1 minute of mixing.
*3 Appearance of roll-mixed sheet was observed with the naked eye to check surface finish and shrinkage and classed according to following ranks A,B,C,D, with the best being A, and the worst being D.
*4 Mixing torque was measured using Plasti-Corder, made by Brabender Co, Ltd.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A polyvinyl chloride composition comprising (I) 99 to 30 weight parts polyvinyl chloride or vinyl chloride copolymer having at least 80 weight percent vinyl chloride and (II) 1 to 70 weight parts of a polymer which is obtained by polymerizing 1 to 30 weight percent of a mixture (B) comprising 40 to 80 weight percent styrene monomer and 60 to 20 weight percent alkyl ester of acrylic acid or alkyl ester of methacrylic acid, in the presence of 99 to 70 weight percent of methyl methacrylate polymer (A) or a copolymer (A) having more than 75 weight percent methyl methacrylate and less than 25 weight percent styrene monomer, said polymer (A) or copolymer (A) having a specific viscosity lower than 0.6; whereby said polyvinyl chloride composition has improved processability, high clarity, and high heat distortion temperature.

2. The composition of claim 1, wherein said specific viscosity is less than 0.3.

3. The composition of claim 1, wherein said polymer (II) is in an amount of 5 to 50 weight parts.

4. The composition of claim 1, wherein said copolymer (A) comprises 85% or more methyl methacrylate, remainder styrene monomer.

5. The composition of claim 1, wherein said styrene monomer is selected from the group consisting of styrene, alpha-methylstyrene, o-methylstyrene, p-tert-butylstyrene, and chlorostyrene.

6. The composition of claim 1, wherein said alkyl ester of acrylic acid or methyacrylic acid, has an alkyl group of carbon number 2 to 18, inclusive.

7. The composition of claim 1, wherein said polyvinyl chloride (I) is polyvinyl chloride or a copolymer selected from the group consisting of vinyl chloride-vinyl acetate copolymer, vinyl chloride-alkyl vinyl ether copolymer, vinyl chloride-ethylene copolymer, and vinyl chloride-propylene copolymer.

8. The composition of claim 1, wherein said copolymer (A) comprises methyl methacrylate and alpha methylstyrene; and wherein said mixture (B) comprises n-butyl acrylate and styrene.

9. The composition of claim 1, wherein said styrene monomer used in said mixture (B) is styrene or alpha methylstyrene; and said alkyl ester of acrylic acid or methacrylic acid is n-butyl acrylate.

* * * * *